US012803129B2

(12) United States Patent
Wang et al.

(10) Patent No.: US 12,803,129 B2
(45) Date of Patent: Nov. 17, 2026

(54) BATTERY WITH A TAB BENDING SPACE BETWEEN A COVER PLATE AND A CORE

(71) Applicant: BYD COMPANY LIMITED, Shenzhen (CN)

(72) Inventors: Xinyue Wang, Shenzhen (CN); Dongjun Deng, Shenzhen (CN)

(73) Assignee: BYD COMPANY LIMITED, Zhenzhen (CN)

(*) Notice: Subject to any disclaimer, the term of this patent is extended or adjusted under 35 U.S.C. 154(b) by 934 days.

(21) Appl. No.: 18/115,212

(22) Filed: Feb. 28, 2023

(65) Prior Publication Data

US 2023/0207982 A1 Jun. 29, 2023

Related U.S. Application Data

(63) Continuation of application No. PCT/CN2021/114106, filed on Aug. 23, 2021.

(30) Foreign Application Priority Data

Aug. 31, 2020 (CN) ......................... 202010899177.5

(51) Int. Cl.
*H01M 50/533* (2021.01)
*H01M 50/172* (2021.01)
(Continued)

(52) U.S. Cl.
CPC ....... *H01M 50/533* (2021.01); *H01M 50/172* (2021.01); *H01M 50/474* (2021.01);
(Continued)

(58) Field of Classification Search
CPC ............. H01M 50/103; H01M 50/105; H01M 50/107; H01M 50/172; H01M 50/474;
(Continued)

(56) References Cited

U.S. PATENT DOCUMENTS

2019/0027711 A1* 1/2019 Minagata ............. H01M 50/119
2019/0221877 A1* 7/2019 Li ....................... H01M 50/533
(Continued)

FOREIGN PATENT DOCUMENTS

CN 104409768 A 3/2015
CN 204885268 U 12/2015
(Continued)

OTHER PUBLICATIONS

International Search Report and Written Opinion for Application No. PCT/CN2021/114106, mailed on Nov. 3, 2021, 15 pages.
(Continued)

*Primary Examiner* — Lingwen R Zeng
(74) *Attorney, Agent, or Firm* — Sheppard Mullin Richter & Hampton LLP

(57) ABSTRACT

A battery includes a casing, a cover plate, and a core. The cover plate is configured to cover the casing, and the core is disposed in the casing. A plurality of tabs is connected between the core and the cover plate. A tab bending space is formed between the cover plate and the core, and the tabs are disposed in the tab bending space. A height of the tab bending space along a first direction is greater than D/10 and less than 3D/4, and D is a thickness of the core.

20 Claims, 2 Drawing Sheets

(51) Int. Cl.

| | |
|---|---|
| ***H01M 50/474*** | (2021.01) |
| ***H01M 50/54*** | (2021.01) |
| *H01M 50/103* | (2021.01) |
| *H01M 50/105* | (2021.01) |
| *H01M 50/107* | (2021.01) |
| *H01M 50/538* | (2021.01) |

(52) U.S. Cl.
CPC .......... *H01M 50/54* (2021.01); *H01M 50/103* (2021.01); *H01M 50/105* (2021.01); *H01M 50/107* (2021.01); *H01M 50/538* (2021.01); *Y02E 60/10* (2013.01); *Y02P 70/50* (2015.11)

(58) Field of Classification Search
CPC .. H01M 50/533; H01M 50/538; H01M 50/54; Y02E 60/10; Y02P 70/50
See application file for complete search history.

(56) References Cited

U.S. PATENT DOCUMENTS

| | | | |
|---|---|---|---|
| 2019/0363401 | A1 | 11/2019 | Lee et al. |
| 2020/0212413 | A1 | 7/2020 | Wakimoto et al. |
| 2020/0251711 | A1 | 8/2020 | Wakimoto et al. |

FOREIGN PATENT DOCUMENTS

| | | | |
|---|---|---|---|
| CN | 205790158 | U | 12/2016 |
| CN | 206250267 | U | 6/2017 |
| CN | 106972144 | A | 7/2017 |
| CN | 107968163 | A | 4/2018 |
| CN | 207690902 | U | 8/2018 |
| CN | 210897462 | U | 6/2020 |
| JP | 2016-110948 | A | 6/2016 |
| JP | 6314086 | B2 | 4/2018 |
| JP | 2018-147749 | A | 9/2018 |
| JP | 2018156724 | A | 10/2018 |
| JP | 2020-013752 | A | 1/2020 |
| JP | 2020-107513 | A | 7/2020 |
| KR | 10-2018-0072065 | A | 6/2018 |
| KR | 10-2020-0096824 | A | 8/2020 |
| WO | 2014002647 | A1 | 1/2014 |
| WO | 2014/027606 | A1 | 2/2014 |

OTHER PUBLICATIONS

Extended European Search Report dated Jan. 19, 2022, issued in related European Patent Application No. 21192778.5 (8 pages).

First Office Action and Search Report dated Sep. 9, 2022, issued in related Chinese Patent Application No. 202010899177.5, with English machine translation (9 pages).

Second Office Action dated Jan. 13, 2023, issued in related Chinese Patent Application No. 202010899177.5, with English machine translation (10 pages).

Request for the Submission of an Opinion dated May 7, 2025, issued in related Korean Patent Application No. 10-2023-7008084, with English machine translation (12 pages).

Notice of Reasons for Refusal dated May 7, 2024, issued in related Japanese Patent Application No. 2023-513943, with English machine translation (8 pages).

Notice of Reasons for Refusal dated Dec. 3, 2024, issued in related Japanese Patent Application No. 2023-513943, with English machine translation (8 pages).

* cited by examiner

BATTERY WITH A TAB BENDING SPACE BETWEEN A COVER PLATE AND A CORE

CROSS-REFERENCE TO RELATED APPLICATIONS

This application is a Continuation Application of International Patent Application No. PCT/CN2021/114106, filed on Aug. 23, 2021, which is based on and claims priority to and benefits of Chinese Patent Application No. 202010899177.5, entitled "BATTERY" and filed on Aug. 31, 2020. The entire content of all of the above-identified applications is incorporated herein by reference.

FIELD

This application relates to the field of batteries, and in particular, to a secondary battery.

BACKGROUND

In the related art, for a secondary battery, a tab led out from the core bends to different degrees in the process of being connected to a cover plate. When the tab bends, the root portion of the tab tilts to push down a separator. The tilting may even be so great that the root portion of the tab crosses the separator and comes into contact with an electrode plate, resulting in a short circuit in the secondary battery. The space design inside the casing of a battery has certain impact on the tab bending angle. If the space is excessively small, the tab is always in a pressed state in the small space, which cannot meet the requirements on the tab bending angle, resulting in a short circuit. If the bending space is excessively large, utilization of the height of the battery core is reduced, resulting in a decreased capacity of the battery core.

SUMMARY

The content of this application resolves at least one of the technical problems existing in the prior art.

This application provides a battery, where the battery includes:

a casing;

a cover plate, the cover plate being configured to cover the casing;

a core, the core being disposed in the casing and provided with tabs; and a plurality of tabs, the plurality of tabs being connected between the core and the cover plate, where a tab bending space is formed between the cover plate and the core, the tabs are disposed in the tab bending space, a height of the tab bending space along a first direction is greater than D/10 and less than 3D/4, and D is a thickness of the core.

According to some embodiments of this application, the height of the tab bending space along the first direction is $D_g$, and $D_g$ meets the following expression:

$$D*\sin 45°\geq D_g\geq[D/2-(\tan(90°-a)*D_z)]\times\tan\beta,$$

$D_z$ ranges from 1 mm to 2 mm, a is a tab bending angle, and β ranges from 10 degrees to 30 degrees.

According to some embodiments of this application, the tab bending angle ranges from 45 degrees to 135 degrees.

According to some embodiments of this application, the core includes a positive electrode plate, a negative electrode plate, and a separator disposed between the positive electrode plate and the negative electrode plate;

the tab bending space is divided into a tab bending region and a tab transition region;

the tab bending region is disposed on an end portion of the separator, each of the tabs bends on the end portion of the separator and forms a tab bending angle, and the tab bending angle is located in the tab bending region; and the tab transition region is disposed between the tab bending region and the cover plate, and each of the tabs passes through the tab transition region and is fixedly connected to the cover plate.

According to some embodiments of this application, a height of the tab bending region along the first direction ranges from 1 mm to 2 mm.

According to some embodiments of this application, along the first direction, a height of the separator is greater than a height of the negative electrode plate, and the height of the negative electrode plate is greater than a height of the positive electrode plate;

along the first direction, a portion of the separator exceeding an end of the negative electrode plate is an exposed separator, and a region in which the exposed separator is located forms a separator extension region; and each of the tabs bends at a junction of the separator extension region and the tab bending region, and forms the tab bending angle.

According to some embodiments of this application, the exposed separator and the tab located in the separator extension region are parallel to each other in the separator extension region.

According to some embodiments of this application, the battery further includes an inner spacer and an outer spacer;

the inner spacer and the outer spacer are connected to the cover plate; and a distance from a lower end surface of the inner spacer to an upper end surface of the core ranges from 0 mm to 1 mm.

According to some embodiments of this application, the tabs are converged and form a tab convergence portion, and a tab protection sheet is disposed outside the tab convergence portion; and a cover plate lead-out sheet is disposed on the cover plate, and the tab protection sheet is connected to the cover plate lead-out sheet.

According to some embodiments of this application, a width of the tab protection sheet ranges from 8 mm to 12 mm.

This application has the following beneficial effects:

The design of the tab bending space in the casing of the battery in this application avoids a case that the tab is pressed to cause a short circuit due to an excessively small tab bending space, and a case that the tab is pulled due to an excessively large tab bending space and the utilization of the height of the battery core is reduced. The battery in this application has a reasonable space design, thereby ensuring that the tab bending angle is kept within a certain range to avoid a short circuit so as to improve the safety of the battery, and ensuring the utilization of the height of the battery core to improve the battery core capacity.

Additional aspects and advantages of this application will be given in the following description, some of which will become apparent from the following description or may be learned from practices of this application.

DETAILED DESCRIPTION

Figure 1:
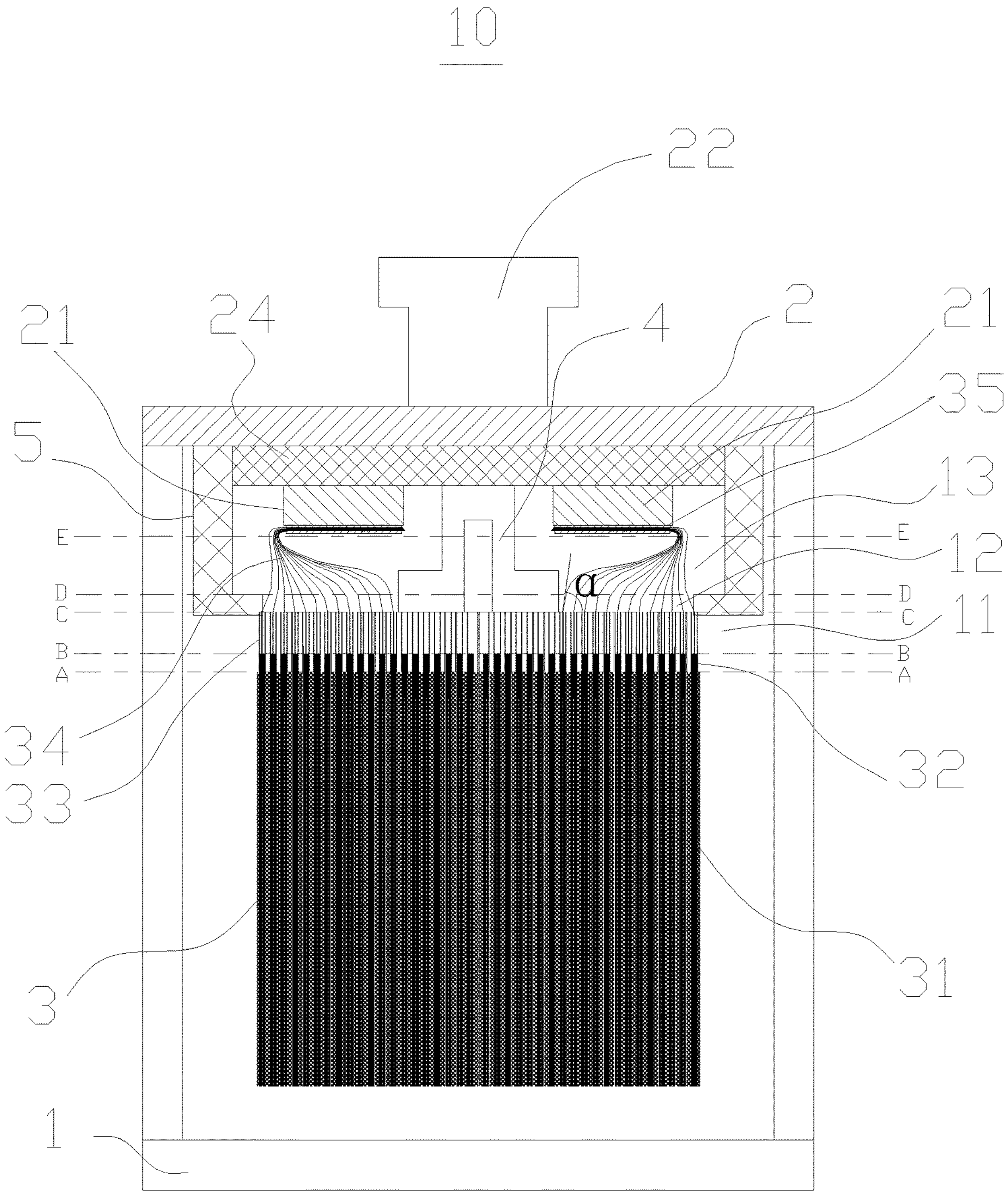
FIG. 1 is a schematic of a cross-sectional view of a battery according to an embodiment of this application.

Embodiments of this application are described in detail below, and examples of the embodiments are shown in accompanying drawings, where the same or similar elements or the elements having same or similar functions are denoted by the same or similar reference numerals throughout the description. The embodiments described below with reference to the accompanying drawings are exemplary and used only for explaining this application, and should not be construed as a limitation on this application.

In the description of this application, it is to be understood that orientation or position relationships indicated by the terms such as “center”, “thickness”, “inner”, “outer”, “axial”, “radial”, and “circumferential” are based on orientation or position relationships shown in the accompanying drawings, and are used only for ease and brevity of illustration and description in this application, rather than indicating or implying that the mentioned apparatus or component needs to have a particular orientation or needs to be constructed and operated in a particular orientation. Therefore, such terms are not to be construed as limiting of this application.

A battery 10 according to an embodiment of this application is described below with reference to the accompanying drawings. The battery 10 may be a secondary lithium ion battery or a battery of another type.

As shown in FIG. 1, the battery 10 in the embodiments of this application includes: a casing 1, a cover plate 2, and a core 3. A cavity for accommodating the core 3 is provided in the casing 1, and the core 3 is disposed in the cavity in the casing 1. One end of the casing 1 is provided with an opening, and the cover plate 2 covers the opening of the casing 1. The core 3 is a laminated core or a wound core. There is at least one core 3, for example, there is one, two or three cores 3 disposed in the casing 1. A quantity of the cores 3 is not limited, as long as the core can meet a requirement in practical installation or usage. The core 3 includes a positive electrode plate 31, a negative electrode plate 32, and a separator 33 disposed between the positive electrode plate and the negative electrode plate. As shown in FIG. 1, an A-A line is a straight line at which an end portion of the positive electrode plate 31 is located; a B-B line is a straight line at which an end portion of the negative electrode plate 32 is located; and a C-C line is a straight line at which an end portion of the separator 33 is located. A height of the separator 33 along a first direction is greater than a height of the negative electrode plate 32 along the first direction, and the height of the negative electrode plate 32 along the first direction is greater than a height of the positive electrode plate 31 along the first direction. The first direction is a height direction of the battery 10. Along the first direction, a portion of the separator 33 exceeding an end of the negative electrode plate 32 is an exposed separator. A plurality of tabs 34 are disposed on the core 3, and the plurality of tabs 34 are connected to electrode plates in the core 3 respectively. The tabs 34 include positive tabs and negative tabs. The positive tabs are connected to the positive electrode plate, and the negative tabs are connected to the negative electrode plate. Ends of a plurality of positive tabs are connected to the positive electrode plate respectively, and the other ends of the plurality of positive tabs are connected to the cover plate after convergence. Ends of a plurality of negative tabs are connected to the negative electrode plate respectively, and the other ends of the plurality of negative tabs are connected to the cover plate after convergence.

As shown in FIG. 1, a tab bending space for accommodating the bent tab 34 is formed between the cover plate 2 and the core 3. The tab bending space includes a tab bending region 12 and a tab transition region 13. As shown in FIG. 1, a D-D line is a dividing line between the tab bending region 12 and the tab transition region 13. A region between the D-D line and an E-E line is the tab transition region 13. Along the first direction, a portion of the separator 33 exceeding an end of the negative electrode plate 32 is an exposed separator, and a region in which the exposed separator is located forms a separator extension region 11. The separator extension region 11, the tab bending region 12, and the tab transition region 13 are distributed in sequence along the first direction. The tab transition region 13 is disposed between the tab bending region 12 and the cover plate 2, and the tab transition region 13 is arranged adjacent to the tab bending region 12. The bent tab 34 passes through the tab transition region 13 and is then fixedly connected to the cover plate 2. The first direction is the height direction of the battery 10. A height of the tab bending region 12 along the first direction ranges from 1 mm to 2 mm. In the separator extension region 11, the exposed separator is parallel to the tab located in the separator extension region, thereby avoiding a case that the tab pushes down the separator to cause a short circuit.

The tab bending region 12 is located on an end portion of the separator 33. The tab 34 bends on the end portion of the separator 33 and forms a tab bending angle a. The tab bending angle a is located in the tab bending region 12. The tab 34 bends at a junction of the separator extension region 11 and the tab bending region 12 and forms the tab bending angle a. The tab bending angle a ranges from 45 degrees to 135 degrees. Preferentially, the tab bending angle ranges from 60 degrees to 120 degrees. The design of the tab bending angle avoids a case that when the tabs bends, the positive and negative electrode plates and the separator press each other due to an excessively small tab bending angle to cause a short circuit of the battery.

A cover plate lead-out sheet 21 is provided on an inner side surface of the cover plate 2. A tab bending space is formed between the cover plate lead-out sheet 21 and the core 3. The tab transition region 13 is disposed between the tab bending region 12 and the cover plate lead-out sheet 21. The inner side surface of the cover plate 2 refers to a side surface of the cover plate 2 opposite to the core 3. After the convergence of the plurality of tabs 34, a tab protection sheet 35 is disposed at a junction of the plurality of tabs 34. A tab convergence portion formed by the plurality of tabs 34 after convergence is disposed between two tab protection sheets 35. The tab convergence portion is soldered to the tab protection sheet 35. The tab protection sheet 35 is soldered to the cover plate lead-out sheet 21 of the cover plate 2, so as to connect the tab 34 to the cover plate 2. A width of the tab protection sheet 35 is greater than or equal to 8 mm and less than or equal to 12 mm. The tab protection sheet 35 ensures that the tab is not ultrasonically cracked during soldering and avoids capacity loss. The width design of the tab protection sheet 35 further ensures that a sufficient soldering region is provided for subsequent laser soldering, and also ensures full compaction during laser soldering, thereby improving the reliability of laser soldering. As shown in the embodiment of FIG. 1, the battery 10 has two cores 3, and the cover plate 2 has two cover plate lead-out sheets 21. After convergence of the plurality of tabs 34 of each core 3, the tabs 34 are bent to be parallel to the cover plate lead-out sheet 21 and are soldered to the cover plate lead-out sheet 21 respectively, so as to ensure reliable soldering of the cover plate lead-out sheet 21 and the tab protection sheet 35. A terminal 22 is disposed on the cover plate 2. The cover plate lead-out sheet 21 is connected to the terminal 22, and the tab protection sheet 35 is soldered to the cover plate lead-out sheet 21, so as to implement connection and current conduction. An insulating member 24 is further disposed between the inner side surface of the cover plate 2 and the cover plate lead-out sheet 21. The insulating member 24 insulates the cover plate 2 from positive and negative electrodes of the core, thereby preventing the positive and negative electrodes from coming into contact with the cover plate at the same time to cause a short circuit of the battery.

In order to ensure that the tab bending angle a is kept within a certain range to avoid a short circuit, and to improve utilization of the height of the battery core, a height of the tab bending space along the first direction is greater than D/10 and less than 3D/4. D is the thickness of the core.

The height of the tab bending space along the first direction is $D_g$, and $D_g$ meets an expression: $D*\sin 45° \geq D_g \geq [D/2-(\tan(90°-a)*D_z)]\times\tan\beta$, where D is the thickness of the core, β ranges from 10° to 30°, that is, β ranges from 10 degrees to 30 degrees, $D_z$ ranges from 1 mm to 2 mm, a is the tab bending angle, and $45° \leq a \leq 135°$, that is a ranges from 45 degrees to 135 degrees.

For example, when the tab bending angle a is 30 degrees, Dz is 1 mm, and β is 10 degrees, $[D/2-(\tan(90°-a)*Dz)]\times\tan\beta=[D/2-(\tan(90°-30°)*1)]\times\tan 10°$.

By designing the tab bending space in the embodiments of this application, the tab bending space can be kept within a reasonable range, so as to prevent the tab from being pressed to cause a short circuit, and improve the utilization of the height of the battery core and the battery core capacity.

The battery 10 in the embodiments of this application further includes an inner spacer 4 and an outer spacer 5. Both the inner spacer 4 and the outer spacer 5 are fixedly connected to the cover plate 2. The inner spacer 4 and the outer spacer 5 may be connected to the cover plate 2 in a fastening manner. The inner spacer 4 is disposed on the inner side surface of the cover plate 2, and a distance between a lower end surface of the inner spacer 4 and an upper end surface of the core 3 ranges from 0 mm to 1 mm. By setting this distance, the bending space may be further limited and supported while preventing the core 3 from moving in the first direction. The outer spacer 5 is disposed on the inner side surface of the cover plate 2 and is disposed perpendicular to the first direction. By disposing the outer spacer 5, the core 3 may be prevented from swaying along a second direction. The second direction is perpendicular to the first direction. The second direction is a width or length direction of the battery 10. There is a certain gap between the outer spacer 5 and the core 3 to prevent the core 3 from being pressed and forced with the outer spacer 5 after expansion.

Figure 2:
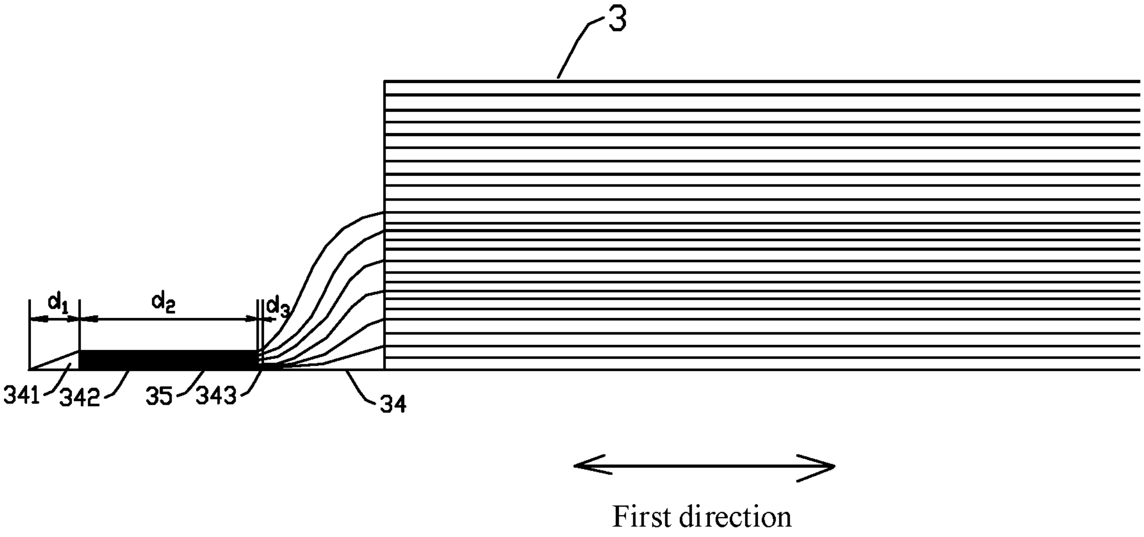
FIG. 2 is a schematic diagram of tabs of a core of a battery that do not bend or that are spread after convergence according to an embodiment of this application.

FIG. 2 is a schematic diagram of tabs of a core of a battery that do not bend or that are spread after convergence according to an embodiment of this application. A plurality of tabs 34 of a core 3 form a tab end-portion staggered layer region 341, a tab soldering region 342, and a pre-soldered press-fit region 343 in sequence after convergence. A width of the tab end-portion staggered layer region 341 is $d_1$. A tab protection sheet 35 is disposed in the tab soldering region 342. A width of the tab protection sheet 35 is $d_2$, and a width direction of the tab protection sheet 35 is a left-right direction in FIG. 2. A width of the pre-soldered press-fit region 343 is $d_3$. A thickness of the core 3 is D, and a length of the tab exposed out of the core 3 is determined according to the width of the tab end-portion staggered layer region 341, the width of the tab soldering region 342, the width of the pre-soldered press-fit region 343, the thickness of the core 3, and a tab bending angle a of the tab 34. A tab bending angle of the tab 34 is a, and the length of the tab exposed out of the core 3 is L and meets an expression: $L=d_1+d_2+d_3+D/2*\tan a$, and $45° \leq a \leq 135°$. $0\text{ mm}<d_1<8\text{ mm}$, and preferentially, $d_1$ is 4 mm. In this way, the width of the tab end-portion staggered layer region 341 is suitable, and the width of the tab end-portion staggered layer region 341 may be prevented from being too large, so that the length of the tab exposed out of the core 3 may be more suitable. $8\text{ mm} \leq d_2 \leq 12\text{ mm}$, and preferentially, $d_2$ is 10 mm. In this way, the width of the tab protection sheet 35 is suitable, and a soldering width of the tab soldering region 342 may be ensured, so that the length of the tab exposed out of the core 3 may be more suitable, which is more conductive to production and manufacturing of the core 3. $0.5\text{ mm} \leq d_3 \leq 2\text{ mm}$, and preferentially, $d_3$ is 1.5 mm. When the plurality of tabs 34 are soldered, by setting $d_3$ to 1.5 mm, a width of the pre-soldered press-fit region 343 can be suitable, and a pre-soldering pressing block may press against the plurality of tabs 34, thereby ensuring the soldering quality of the plurality of tabs 34 and further ensuring the production quality of the core 3.

Figure 3:
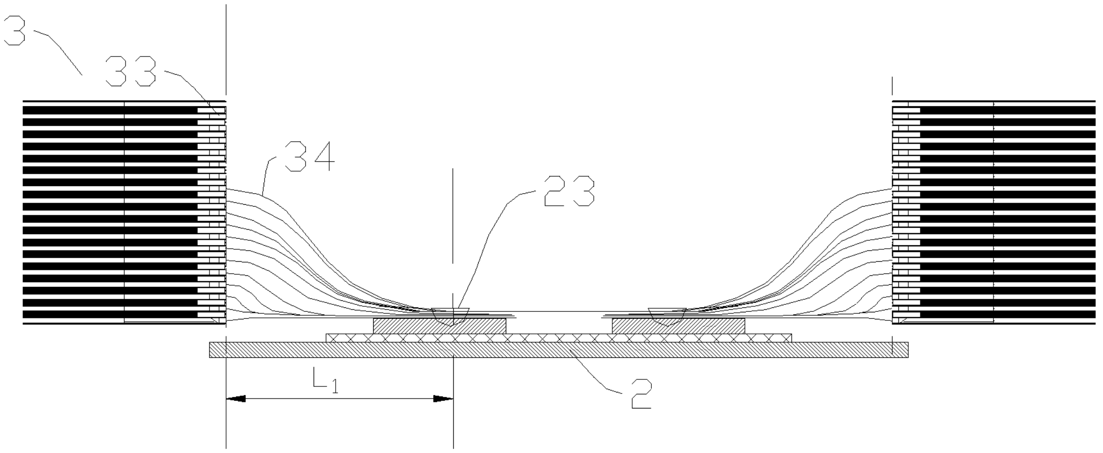
FIG. 3 is a schematic diagram of a core of a battery connected to a cover plate in parallel before tab convergence or when tabs being spread according to an embodiment of this application.

FIG. 3 is a schematic diagram of a core of a battery connected to a cover plate in parallel before convergence or when being spread according to an embodiment of this application. A plurality of tabs 34 are soldered to a cover plate 2 of a battery 10 after convergence and a solder joint 23 is formed. A distance between a core 3 and the solder joint 23 is determined according to a thickness of the core 3, a tab bending angle a of the tab 34, and a width of a tab protection sheet 35. The distance between the core 3 and the solder joint 23 is $L_1$, the thickness of the core 3 is D, the width of the tab protection sheet 35 is $d_2$, and the tab bending angle of the tab 34 is a, and an expression is met as follows: $L_1=D/2*\tan a+d_2/2$, where the tab bending angle a meets an expression: $45° \leq a \leq 135°$. A distance from an end portion of a separator 33 of the core 3 opposite to the solder joint 23 to a center-point position of the solder joint 23 is $L_1$. In this way, the tab 34 can be prevented from being pulled after bending and may further be prevented from being torn. In addition, a length that the tab 34 can move is more suitable to prevent the tab 34 from being pressed, thereby improving the safety of the battery 10 in use.

Other configurations and operations of the battery 10 according to the embodiments of this application are known to those of ordinary skill in the art and will not be described in detail herein.

In description of this specification, description of reference terms such as "specific embodiment" and "specific example" means including specific features, structures, materials, or features described in the embodiment or example in at least one embodiment or example of this application. In this specification, exemplary descriptions of the foregoing terms do not necessarily refer to the same embodiment or example.

Although the embodiments of this application have been shown and described, a person of ordinary skill in the art is to be understood that various changes, modifications, replacements, and variations may be made to the embodiments without departing from the principles and spirit of this application, and the scope of this application is as defined by the appended claims and their equivalents.

What is claimed is:

1. A battery, comprising:
a casing;
a cover plate, the cover plate being configured to cover the casing; and
a core, the core being disposed in the casing; and
a plurality of tabs, the plurality of tabs being connected between the core and the cover plate,
wherein a tab bending space is formed between the cover plate and the core, the tabs are disposed in the tab bending space, a height of the tab bending space along a first direction is greater than D/10 and less than 3D/4, and D is a thickness of the core.

2. The battery according to claim 1, wherein
the height of the tab bending space along the first direction is $D_g$, and $D_g$ meets the following expression:

$$D*\sin 45°\geq D_g\geq[D/2-(\tan(90°-a)*D_z)]\times\tan\beta,$$

wherein $D_z$ ranges from 1 mm to 2 mm, a is a tab bending angle, and β ranges from 10 degrees to 30 degrees.

3. The battery according to claim 2, wherein
the tab bending angle ranges from 45 degrees to 135 degrees.

4. The battery according to claim 1, wherein
the core comprises a positive electrode plate, a negative electrode plate, and a separator disposed between the positive electrode plate and the negative electrode plate;
the positive electrode plate is connected to a positive tab, and the negative electrode plate is connected to a negative tab;
the tab bending space is divided into a tab bending region and a tab transition region;
the tab bending region is disposed on an end portion of the separator, each of the tabs bends on the end portion of the separator and forms a tab bending angle, and the tab bending angle is located in the tab bending region; and
the tab transition region is disposed between the tab bending region and the cover plate, and each of the tabs passes through the tab transition region and is fixedly connected to the cover plate.

5. The battery according to claim 4, wherein a height of the tab bending region along the first direction ranges from 1 mm to 2 mm.

6. The battery according to claim 4, wherein
along the first direction, a height of the separator is greater than a height of the negative electrode plate, and the height of the negative electrode plate is greater than a height of the positive electrode plate;
along the first direction, a portion of the separator exceeding an end of the negative electrode plate is an exposed separator, and a region in which the exposed separator is located forms a separator extension region; and
each of the tabs bends at a junction of the separator extension region and the tab bending region, and forms the tab bending angle.

7. The battery according to claim 6, wherein the exposed separator and the tabs located in the separator extension region are parallel to each other in the separator extension region.

8. The battery according to claim 2, wherein
the core comprises a positive electrode plate, a negative electrode plate, and a separator disposed between the positive electrode plate and the negative electrode plate;
the positive electrode plate is connected to a positive tab, and the negative electrode plate is connected to a negative tab;
the tab bending space is divided into a tab bending region and a tab transition region;
the tab bending region is disposed on an end portion of the separator, each of the tabs bends on the end portion of the separator and forms a tab bending angle, and the tab bending angle is located in the tab bending region; and
the tab transition region is disposed between the tab bending region and the cover plate, and each of the tabs passes through the tab transition region and is fixedly connected to the cover plate.

9. The battery according to claim 8, wherein a height of the tab bending region along the first direction ranges from 1 mm to 2 mm.

10. The battery according to claim 8, wherein
along the first direction, a height of the separator is greater than a height of the negative electrode plate, and the height of the negative electrode plate is greater than a height of the positive electrode plate;
along the first direction, a portion of the separator exceeding an end of the negative electrode plate is an exposed separator, and a region in which the exposed separator is located forms a separator extension region; and
each of the tabs bends at a junction of the separator extension region and the tab bending region, and forms the tab bending angle.

11. The battery according to claim 10, wherein the exposed separator and the tabs located in the separator extension region are parallel to each other in the separator extension region.

12. The battery according to claim 1, wherein
the battery further comprises an inner spacer and an outer spacer, the inner spacer is disposed between a positive tab and a negative tab, the outer spacer is disposed between the tabs and the casing;
an insulating member is disposed on an inner side surface of the cover plate between the inner spacer and the outer spacer;
the inner spacer and the outer spacer are connected to the cover plate; and
a distance from a lower end surface of the inner spacer to an upper end surface of the core ranges from 0 mm to 1 mm.

13. The battery according to claim 12, wherein
the tabs are converged and form a tab convergence portion, and a tab protection sheet is disposed outside the tab convergence portion; and
a cover plate lead-out sheet is disposed on the cover plate and extends through the insulating member, and the tab protection sheet is connected to the cover plate lead-out sheet.

14. The battery according to claim 13, wherein a width of the tab protection sheet ranges from 8 mm to 12 mm.

15. The battery according to claim 2, wherein
the battery further comprises an inner spacer and an outer spacer;
the inner spacer and the outer spacer are connected to the cover plate; and
a distance from a lower end surface of the inner spacer to an upper end surface of the core ranges from 0 mm to 1 mm.

16. The battery according to claim 15, wherein the core comprises a positive electrode plate, a negative electrode plate, and a separator disposed between the positive electrode plate and the negative electrode plate;

the tab bending space is divided into a tab bending region and a tab transition region;

the tab bending region is disposed on an end portion of the separator, each of the tabs bends on the end portion of the separator and forms a tab bending angle, and the tab bending angle is located in the tab bending region; and the tab transition region is disposed between the tab bending region and the cover plate, and each of the tabs passes through the tab transition region and is fixedly connected to the cover plate.

17. The battery according to claim 16, wherein a height of the tab bending region along the first direction ranges from 1 mm to 2 mm.

18. The battery according to claim 16, wherein along the first direction, a height of the separator is greater than a height of the negative electrode plate, and the height of the negative electrode plate is greater than a height of the positive electrode plate;

along the first direction, a portion of the separator exceeding an end of the negative electrode plate is an exposed separator, and a region in which the exposed separator is located forms a separator extension region; and each of the tabs bends at a junction of the separator extension region and the tab bending region, and forms the tab bending angle.

19. The battery according to claim 2, wherein the tabs are converged and form a tab convergence portion, and a tab protection sheet is disposed outside the tab convergence portion; and a cover plate lead-out sheet is disposed on the cover plate, and the tab protection sheet is connected to the cover plate lead-out sheet.

20. The battery according to claim 19, wherein a width of the tab protection sheet ranges from 8 mm to 12 mm.

* * * * *